United States Patent [19]
Yamaguchi

[11] Patent Number: 5,866,489
[45] Date of Patent: Feb. 2, 1999

[54] GLASS-CERAMIC SUBSTRATE FOR A MAGNETIC DISK

[75] Inventor: Katsuhiko Yamaguchi, Sagamihara, Japan

[73] Assignee: Kabushiki Kaisha Ohara, Japan

[21] Appl. No.: 792,998

[22] Filed: Feb. 3, 1997

[30] Foreign Application Priority Data

Feb. 2, 1996 [JP] Japan ................................. 8-040374

[51] Int. Cl.$^6$ .......................... C03C 10/04; C03C 10/14
[52] U.S. Cl. .................... 501/4; 501/5; 501/63; 501/69
[58] Field of Search ................ 501/4, 5, 63, 69

[56] References Cited

U.S. PATENT DOCUMENTS

| | | | |
|---|---|---|---|
| 4,480,044 | 10/1984 | McAlinn | 501/4 |
| 5,391,522 | 2/1995 | Goto et al. | 501/4 |
| 5,567,217 | 10/1996 | Goto et al. | 501/5 |
| 5,580,363 | 12/1996 | Goto et al. | 501/4 |
| 5,626,935 | 5/1997 | Goto et al. | 428/64.1 |

FOREIGN PATENT DOCUMENTS 0626353  11/1994  European Pat. Off. .

OTHER PUBLICATIONS

Japanese Patent Application Laid–open No. Hei 6–329440, Nov. 29, 1994.

*Primary Examiner*—Karl Group
*Attorney, Agent, or Firm*—Hedman, Gibson & Costigan, P.C.

[57] ABSTRACT

A glass-ceramic substrate for a magnetic disk suitable for use as a contact recording type magnetic disk includes alpha-cristobalite (alpha-$SiO_2$) and lithium disilicate ($Li_2O \cdot 2SiO_2$) as main crystal phases. The ratio of alpha-cristobalite/lithium disilicate is within a range from 0.25 to 0.35, a grain diameter of crystal grains is within a range from 0.1 $\mu$m to 1.0 $\mu$m, surface roughness (Ra) of the substrate after polishing is within a range from 2 Å to 10 Å and abrasion resistance index (Aa) of the substrate is within a range from 5 to 15.

3 Claims, 2 Drawing Sheets

GLASS-CERAMIC SUBSTRATE FOR A MAGNETIC DISK

BACKGROUND OF THE INVENTION

This invention relates to a magnetic disk substrate used for a bard magnetic disk recording device and, more particularly, to a magnetic disk substrate made of a glass-ceramic suitable for use as a contact recording type magnetic disk.

There is an increasing tendency for utilizing a personal computer for multiple media purposes and this tendency necessitates a hard magnetic disk device of a larger recording capacity. For this purpose, the bit number and track density of a magnetic disk must be increased and the size of a bit cell must be reduced for increasing a surface recording density. As for a magnetic head, it must be operated in closer proximity to the disk surface in conformity with the size reduction of the bit cell and, for this purpose, the contact recording system has been developed according to which recording is performed with the magnetic head being nearly in contact with the disk surface, and with the amount of lifting of the magnetic head from the disk surface being maintained below 0.023 $\mu$m.

In such contact recording system, the magnetic disk is required to have the surface roughness (Ra) of 10 Å or below in order to maintain the amount of lifting of the magnetic head below 0.025 $\mu$m. Besides, the magnetic disk is required to have abrasion resistance which is sufficiently high for standing contact with the magnetic head.

Aluminum alloy has been conventionally used as a material of magnetic disk substrate. The aluminum alloy substrate, however, tends to produce a substrate surface having projections or spot-like projections and depressions during the polishing process due to defects inherent in the material. As a result, the aluminum alloy substrate is not sufficient in flatness. Further, since an aluminum alloy is a soft material, deformation tends to take place so that it cannot cope with the recent requirement for making the magnetic disk thinner and the requirement for high density recording because the disk tends to be deformed by contact with the head with resulting damage to the recorded contents.

As a material for overcoming this problem of the aluminum alloy substrate, known in the art are glass substrate for magnetic disks made of a chemically tempered glass such as a sodium lime glass ($SiO_2$—$CaO$—$Na_2O$) and aluminosilicate glass ($SiO_2$—$Al_2O_3$—$Na_2O$). This glass substrate, however, has the following disadvantages:

(1) Polishing is made after chemical tempering and so the tempered layer tends to cause instability in thinning the disk substrate.
(2) Since the $Na_2O$ ingredient is included as an essential ingredient in the glass, the film forming characteristic of the glass is deteriorated with the result that a surface coating processing becomes necessary for preventing eluting of the $Na_2O$ ingredient. This prevents mass production of the product at a competitive cost.

Aside from the aluminum alloy substrate and chemically tempered glass substrate, known in the art are some substrate made of glass-ceramics. For example, Japanese Patent Application Laid-open No. 6-329440 discloses a glass-ceramic of a $SiO_2$—$Li_2O$—$MgO$—$P_2O_5$ system which includes lithium disilicate ($Li_2O$ . $2SiO_2$) and alpha-quartz (alpha-$SiO_2$) as predominant crystal phases. This glass-ceramic is an excellent material in that the grain size of globular grains of alpha-quartz can be controlled but surface roughness (Ra) of a polished surface is within a range from 15 Å to 50 Å. This glass-ceramic cannot cope with the above described target surface roughness (Ra) of 10 Å or below so that it cannot sufficiently cope with the above described tendency to lowering of the amount of lifting of a magnetic head necessitated by rapid increase in the recording capacity.

It is, therefore, an object of the invention to eliminate the above described disadvantages of the prior art substrates and provide a glass-ceramic substrate for a magnetic disk which is suitable for use as a contact recording type magnetic disk for coping with the tendency toward high recording density of a hard magnetic disk by having surface roughness (Ra) of 10 Å or below and also having a high abrasion resistance.

SUMMARY OF THE INVENTION

Accumulated studies and experiments made by the inventor of the present invention for achieving the above described object of the invention have resulted in the finding, which has led to the present invention, that, in a glass-ceramic comprising alpha-cristobalite (alpha-$SiO_2$)' and lithium disilicate ($Li_2O$ . $2SiO_2$) as main crystal phases obtained by subjecting to heat treatment, within a specific temperature range, a base glass of a $SiO_2$—$Li_2O$—$Al_2O_3$—$P_2O_5$ system containing MgO and ZnO as essential ingredients, by restricting the ratio of alpha-cristobalite to lithium disilicate to an extremely narrow range from 0.25 to 0.35, there is provided an ideal magnetic disk substrate for the contact recording system which has surface roughness (Ra) after polishing of the substrate within a range from 2 Å to 10 Å and abrasion resistance index within a range from 5 to 15.

For achieving the above described object of the invention, there is provided a glass-ceramic substrate for a magnetic disk comprising alpha-cristobalite (alpha-$SiO_2$) and lithium disilicate ($Li_2O$ . $2SiO_2$) as main crystal phases characterized in that the ratio of alpha-cristobalite/lithium disilicate is within a range from 0.25 to 0.35, a grain diameter of crystal grains is within a range from 0.1 $\mu$m to 1.0 $\mu$m, surface roughness (Ra) of the substrate after polishing is within a range from 2 Å to 10 Å and abrasion resistance index (Aa) of the substrate is within a range from 5 to 15.

In one aspect of the invention, the glass-ceramic substrate is formed by subjecting to heat treatment a base glass which consists in weight percent of:

| | |
|---|---|
| $SiO_2$ | 75–83% |
| $Li_2O$ | 7–13% |
| $Al_2O_3$ | 1–5% |
| $P_2O_5$ | 1–3% |
| MgO | 0.5–3% |
| ZnO | 0.5–3% |
| $K_2O$ | 0–5% |
| $As_2O_3$ and/or $Sb_2O_3$ | 0–2%. |

The invention will be described in detail below with reference to the accompanying drawing and photographs.

DETAILED DESCRIPTION OF THE INVENTION

Figure 1:
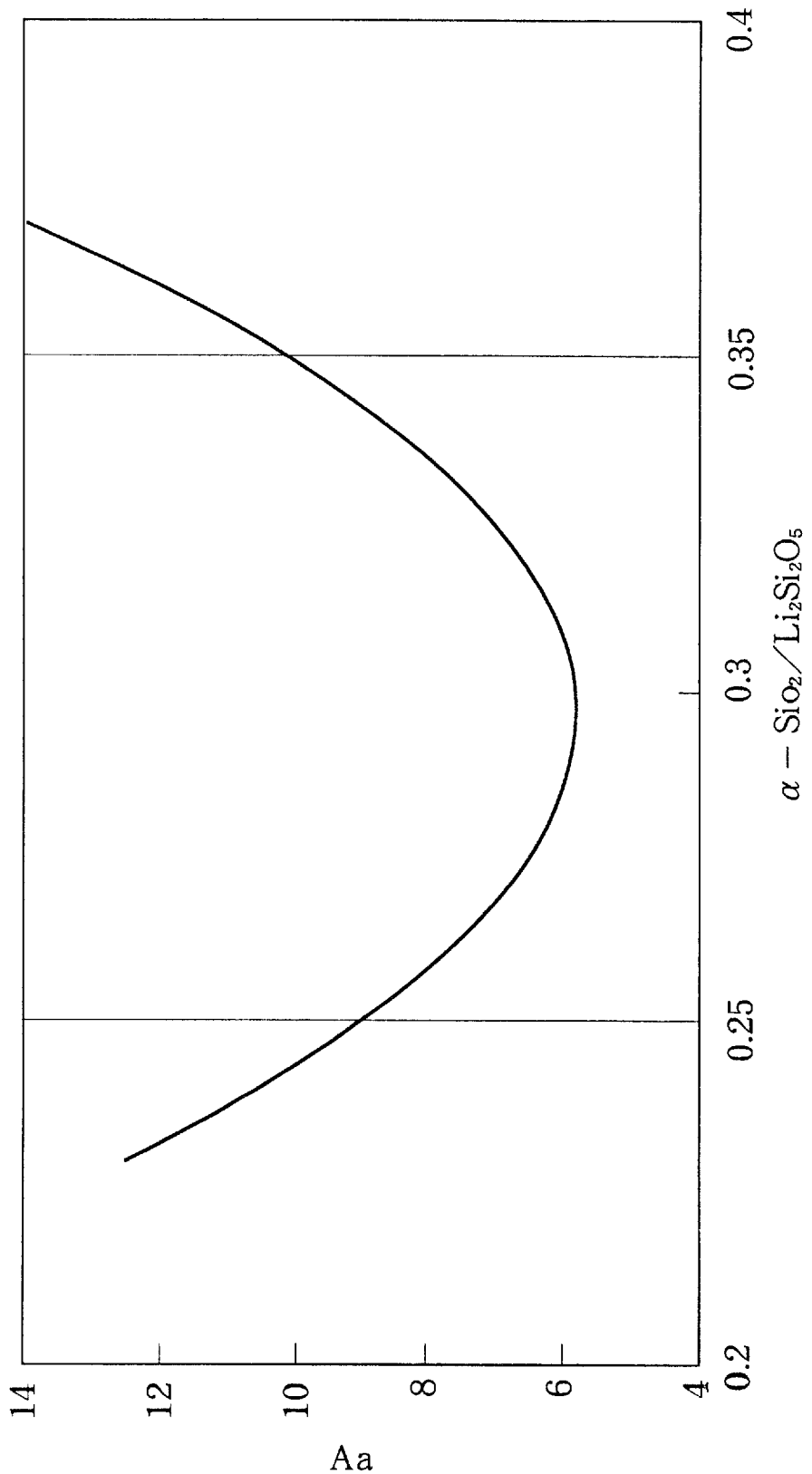
FIG. 1 is a graph showing relationship between the ratio of alpha-cristobalite/lithium disilicate and abrasion resistance index (Aa)
Figure 2:
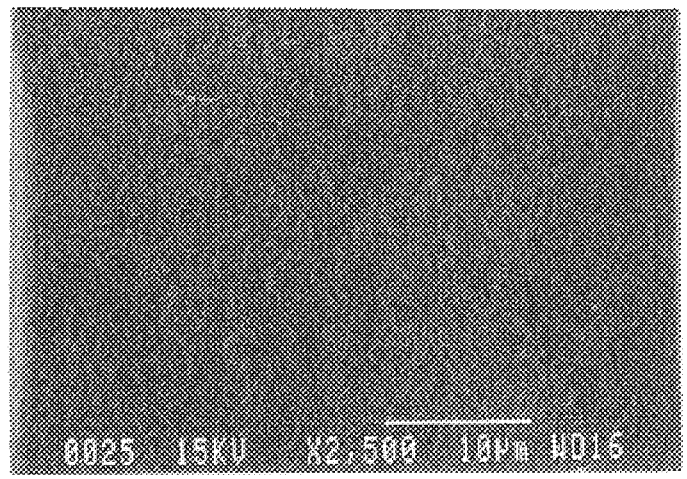
FIG. 2 is an electron microscope photograph showing the crystal structure of an embodiment of the glass-ceramic substrate according to the present invention.
Figure 3:
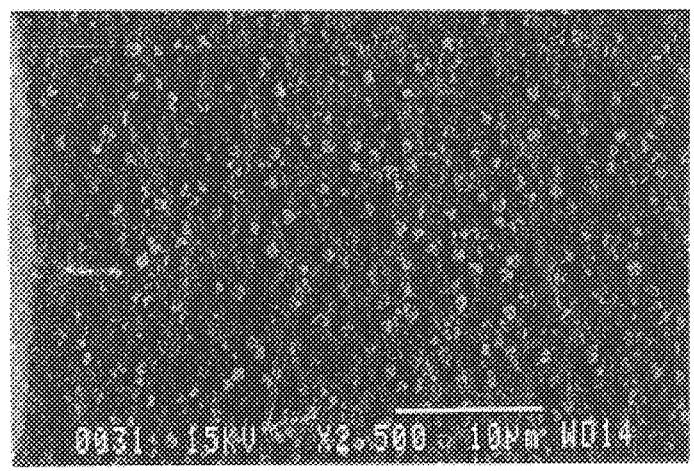
FIG. 3 is an electron microscope photograph showing the crystal structure of the glass-ceramic substrate of Comparative Example 1.
Figure 4:
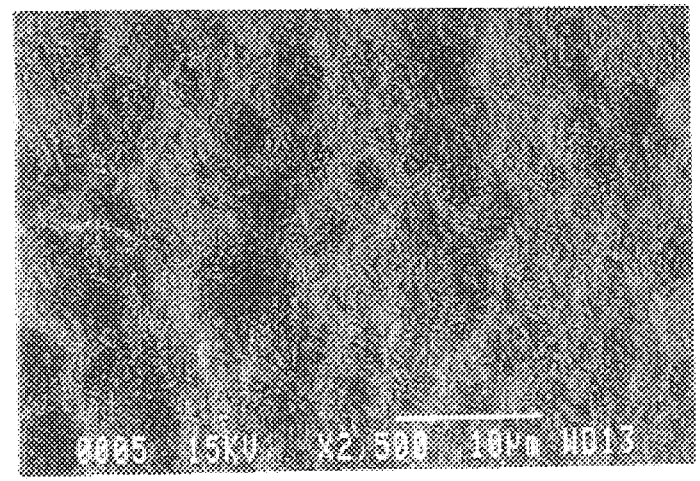
FIG. 4 is an electron microscope photograph showing the crystal structure of the glass-ceramic substrate of Comparative Example 2.

The composition of the glass-ceramic substrate of the invention is expressed on the basis of composition of oxides as in its base glass. The above described content ranges of the respective ingredients have been selected for the reasons stated below.

The $SiO_2$ ingredient is an important ingredient which produces lithium disilicate ($Li_2 \cdot 2SiO2$) and alpha-cristobalite (alpha-$SiO_2$) as main crystal phases when the base glass is subjected to heat treatment. If the amount of this ingredient is below 75.0%, the crystal produced in the glass-ceramic is instable and its texture tends to become too rough. If the amount of this ingredient exceeds 83.0%, difficulty arises in melting of the base glass.

The $Li_2O$ ingredient is also an important ingredient which produces lithium disilicate ($Li_2O \cdot 2SiO_2$) crystal as one of the main crystal phases by heat treating the base glass. If the amount of this ingredient is below 7%, growth of this crystal becomes difficult and melting of the base glass becomes also difficult. If the amount of this ingredient exceeds 13%, the grown crystal of the glass-ceramic becomes instable and its texture tends to become too rough and, besides, chemical durability and hardness of the glass-ceramic are deteriorated.

The $K_2O$ ingredient improves melting property of the base glass and can be included up to the amount of 5%.

The MgO ingredient is an important ingredient which determines the state of grown crystal phases. If the amount of this ingredient is below 0.5%, the alpha-cristobalite phase grows excessively with resulting deterioration in abrasion resistance. If the amount of this ingredient exceeds 3%, an undesirable alpha-quartz crystal phase grows and, moreover, the crystal grains grow too rough with the result that a desired surface roughness cannot be achieved. The ZnO ingredient is added because it has an equivalent function to the MgO Ingredient but the amount of this ingredient is restricted to the range from 0.5% to 3% for the same reason as in the MgO ingredient.

The $P_2O_5$ ingredient is an indispensable ingredient as a nucleating agent for the glass-ceramic. If the amount of this ingredient is below 1%, the grains of the lithium dislicate and alpha-cristobalite crystal phases become too rough with the result that desired surface roughness and abrasion resistance cannot be achieved. If the amount of this ingredient exceeds 3%, devitrification occurs during forming of the glass with the result that grains of tho grown crystal phases become too rough.

The $Al_2O_3$ ingredient improves chemical durability of the glass-ceramic. If the amount of this ingredient is below 1%, this effect cannot be obtained whereas, if the amount of this ingredient exceeds 5%, melting property of the glass is deteriorated.

The $As_2O_3$ and/or $Sb_2O_3$ ingredients may be added as refining agents in melting of the base glass. It will suffice if total of up to 2% of one or two of these ingredients is added.

In the glass-ceramic of the present invention, a small amount of one or more of $B_2O_3$, CaO, SrO, BaO, $TiO_2$, SnO and $ZrO_2$ may be added optionally to such a degree that the addition of the optional ingredient will not impair the desired properties of the glass-ceramic.

As to the ratio of crystal phases of the glass-ceramic substrate according to the invention, the ratio of alpha-cristobalite/lithium disilicate is confined to the range from 0.25 to 0.35. This ratio was determined by observing the ratio of the respective crystal phases on the basis of peak heights in XRD and using peak planes of alpha-cristobalite (101) and lithium disilicate (130). This ratio is confined within the range of 0.25–0.33 because it has been found as a result of numerous experiments that the deal surface roughness of the glass-ceramic substrate after polishing within the range from 2 Å to 10 Å can be obtained within this specific ratio of alpha-cristobalite to lithium disilicate and also because, as is clearly shown in FIG. 1, abrasion resistance index (Aa) is sharply deteriorated if the ratio is below 0.25 or exceeds 0.35 whereas a desirable surface characteristic with the abrasion resistance index (Aa) of about 15 or below can be achieved within the range from 0.25 to 0.35.

The glass-ceramic substrate according to the invention has abrasion resistance index (Aa) between 5 and 15, preferably between 5 and 12 whereby it has a sufficient abrasion resistance for standing the contact recording with the amount of lifting of the magnetic head being maintained below 0.025 $\mu$m.

For manufacturing the glass-ceramic substrate for a magnetic disk, the base glass having the above described composition is subjected to heat forming and/or cold forming, is heat treated for producing a crystal nucleus under a temperature within a range from 400° C. to 550° C. and is further heat treated for crystallization under a temperature within a range from 720° C. to 820° C. Thereafter, the glass-ceramic which has been crystallized in this manner is lapped and polished in a well known manner to surface roughness (Ra) after polishing within a range from 2 Å to 10 Å.

EXAMPLES

Preferred examples of the glass-ceramic substrate according to the invention will now be described. Tables 1 to 6 show examples (No. 1 to No. 10) and comparative examples (Comparative Examples No. 1 and No. 2) of composition together faith results of measurement of the temperature of nucleation, temperature of crystallization, main crystal phases, grain diameter of crystal grains, surface roughness (Ra) after polishing and abrasion resistance index. The compositions of the examples and comparative examples are expressed in weight percent.

TABLE 1

| | Examples | |
| --- | --- | --- |
| | No. 1 | 2 |
| $SiO_2$ | 82.0 | 80.0 |
| $Li_2O$ | 7.0 | 10.0 |
| $Al_2O_3$ | 1.0 | 2.0 |
| MgO | 0.5 | 2.0 |
| ZnO | 1.0 | 0.5 |
| $K_2O$ | 5.0 | 4.3 |
| $P_2O_5$ | 3.0 | 1.0 |
| $As_2O_3$ | 0.5 | |
| $Sb_2O_3$ | | 0.2 |
| Other oxide | | |
| nucleation temperature (°C. × hour) | 450 × 4 | 480 × 5 |
| crystallization temperature (°C. × hour) | 720 × 2 | 800 × 1 |
| crystal phase | $Li_2Si_2O_5$ | $Li_2Si_2O_5$ |

TABLE 1-continued

| | Examples | |
|---|---|---|
| | No. 1 | 2 |
| | alpha-cristobalite | alpha-cristobalite |
| alpha-cristobalite/lithium disilicate | 0.30 | 0.25 |
| grain diameter (μm) | 0.1 | 0.6 |
| surface roughness (Ra)(Å) | 3 | 7 |
| abrasion resistance index (Aa) | 6 | 12 |

TABLE 2

| | Examples | |
|---|---|---|
| | No. 3 | 4 |
| $SiO_2$ | 78.0 | 79.0 |
| $Li_2O$ | 11.0 | 7.0 |
| $Al_2O_3$ | 3.3 | 5.0 |
| MgO | 1.0 | 2.0 |
| ZnO | 0.5 | 3.0 |
| $K_2O$ | 4.0 | 1.0 |
| $P_2O_5$ | 2.0 | 2.5 |
| $As_2O_3$ | | |
| $Sb_2O_3$ | 0.2 | 0.5 |
| Other oxide | | |
| nucleation temperature (°C. × hour) | 540 × 5 | 500 × 1 |
| crystallization temperature (°C. × hour) | 780 × 2 | 800 × 5 |
| crystal phase | $Li_2Si_2O_5$ alpha-cristobalite | $Li_2Si_2O_5$ alpha-cristobalite |
| alpha-cristobalite/lithium disilicate | 0.25 | 0.28 |
| grain diameter (μm) | 0.6 | 0.8 |
| Surface roughness (Ra)(Å) | 7 | 8 |
| abrasion resistance index (Aa) | 9 | 10 |

TABLE 3

| | Examples | |
|---|---|---|
| | No. 5 | 6 |
| $SiO_2$ | 73.0 | 79.3 |
| $Li_2O$ | 13.0 | 11.0 |
| $Al_2O_3$ | 5.0 | 3.5 |
| MgO | 2.0 | 0.5 |
| ZnO | 3.0 | 0.5 |
| $K_2O$ | | 3.0 |
| $P_2O_5$ | 1.5 | 1.0 |
| $As_2O_3$ | | 0.2 |
| $Sb_2O_3$ | 0.5 | |
| Other oxide | | $ZrO_2$ 1.0 |
| nucleation temperature (°C. × hour) | 400 × 4 | 540 × 2 |
| crystallization temperature (°C. × hour) | 820 × 2 | 780 × 2 |
| crystal phase | $Li_2Si_2O_5$ alpha-cristobalite | $Li_2Si_2O_5$ alpha-cristobalite |
| alpha-cristabalite/lithium disilicate | 0.28 | 0.25 |
| grain diameter (μm) | 0.6 | 0.4 |
| surface roughness (Ra)(Å) | 5 | 4 |
| abrasion resistance index (Aa) | 8 | 6 |

TABLE 4

| | Examples | |
|---|---|---|
| | No. 7 | 8 |
| $SiO_2$ | 76.3 | 82.0 |
| $Li_2O$ | 12.0 | 7.0 |
| $Al_2O_3$ | 4.0 | 1.0 |
| MgO | 0.5 | 0.5 |
| ZnO | 1.0 | 1.0 |
| $K_2O$ | 4.0 | 5.0 |
| $P_2O_5$ | 1.0 | 2.0 |
| $As_2O_3$ | | |
| $Sb_2O_3$ | 0.2 | 0.5 |
| Other oxide | $TiO_2$ 1.0 | CaO 0.5 BaO 0.5 |
| nucleation temperature (°C. × hour) | 550 × 5 | 540 × 2 |
| crystallization temperature (°C. × hour) | 770 × 5 | 770 × 3 |
| crystal phase | $Li_2Si_2O_5$ alpha-cristobalite | $Li_2Si_2O_5$ alpha-cristobalite |
| alpha-cristobalite/lithium disilicate | 0.34 | 0.30 |
| grain diameter (μm) | 0.7 | 0.5 |
| surface roughness (Ra)(Å) | 8 | 7 |
| abrasion resistance index (Aa) | 10 | 8 |

TABLE 5

| | Examples | |
|---|---|---|
| | No. 9 | 10 |
| $SiO_2$ | 79.5 | 78.0 |
| $Li_2O$ | 10.0 | 11.0 |
| $Al_2O_3$ | 3.0 | 2.0 |
| MgO | 0.5 | 2.0 |
| ZnO | 2.0 | 1.0 |
| $K_2O$ | | 2.0 |
| $P_2O_5$ | 2.5 | 3.0 |
| $As_2O_3$ | 0.5 | |
| $Sb_2O_3$ | | 0.5 |
| Other oxide | $B_2O_3$ 1.0 SrO 1.0 | SnO 0.5 |
| nucleation temperature (°C. × hour) | 500 × 4 | 480 × 5 |
| crystallization temperature (°C. × hour) | 820 × 5 | 750 × 2 |
| crystal phase | $Li_2Si_2O_5$ alpha-cristobalite | $Li_2Si_2O_5$ alpha-cristobalite |
| alpha-cristobalite/lithium disilicate | 0.30 | 0.25 |
| grain diameter (μm) | 0.8 | 0.2 |
| surface roughness (Ra)(Å) | 9 | 3 |
| abrasion resistance index (Aa) | 7 | 6 |

TABLE 6

| | Comparative Examples | |
|---|---|---|
| | No. 1 | 2 |
| $SiO_2$ | 7.0 | 76.0 |
| $Li_2O$ | 8.0 | 9.7 |
| $Al_2O_3$ | 5.0 | 3.5 |
| MgO | 4.0 | 1.5 |
| ZnO | 0.5 | |
| $K_2O$ | 4.0 | 3.5 |
| $P_2O_5$ | 4.0 | 3.5 |
| $As_2O_3$ | 0.5 | 0.3 |
| $Sb_2O_3$ | | |
| Other oxide | SrO 1.0 | $Na_2O$ 1.0 |

TABLE 6-continued

|  | Comparative Examples | |
| --- | --- | --- |
|  | No. 1 | 2 |
| nucleation temperature (°C. × hour) | 500 × 2 | TiO$_2$ 1.0<br>500 × 3 |
| crystallization temperature (°C. × hour) | 800 × 5 | 800 × 5 |
| crystal phase | Li$_2$Si$_2$O$_5$<br>alpha-quartz | Li$_2$Si$_2$O$_5$<br>alpha-cristobalite |
| alpha-cristobalite/lithium disilicate | — | 0.15 |
| grain diameter (μm) | 1.3 | 2.0 |
| surface roughness (Ra)(Å) | 35 | 15 |
| abrasion resistance index (Aa) | 20 | 21 |

For manufacturing the glass-ceramic substrates of the above described examples, materials including oxides, carbonates and nitrates are mixed and molten in a conventional melting appratus at a temperature within the range from about 1350° C. to about 1500° C. The molten glass is stirred to homogenize it and thereafter formed into a disk shape and annealed to provide a formed glass. Then, this formed glass is subjected to heat treatment to produce the crystal nucleus under a temperature within the range from 400° C. to 550° C. and is subjected to a further heat treatment for crystallization under a temperature within the range from 720° C. to 820° C. for about one to five hours to produce the desired glass-ceramic. In producing a test piece for measuring surface roughness, such test piece is made by polishing the above described glass-ceramic with an abrasive having an average grain diameter of 9–12 μm for about ten to twenty minutes.

Abrasion resistance index used in this specification and claims is measured by employing a method designated by the Japan Optical Glass Industry Association. More specifically, a test piece consisting of a square glass plate having the size of 30×30×10 mm is placed at a designated location which is distant by 80 mm from the center on a flat disk having a diameter of 250 mm made of cast iron which is rotating on a horizontal plane at a rotation speed of 60 rpm, Then, while a vertical load or 9.8N (1 kgf) is being applied, water of 20 ml added with 10 g of =800 lapping material (alumina A abrasive) having an average grain size of 20 μm is uniformly supplied for five minutes to cause abrasion to the test piece. Mass of the test piece before the lapping operation and that after the lapping operation are measured to obtain mass of abrasion. Likewise, mass of abrasion of a reference test piece designated by the Japan Optical Glass Industry Association is measured and a value which is calculated by the following equation is used herein as the abrasion resistance index (Aa):

$$\text{Abrasion resistance index } (Aa) = \frac{\text{mass of abrasion of test piece/specific gravity}}{\text{mass of abrasion of reference test piece/specific gravity}} \times 100$$

As shown in the tables, the glass-ceramics of the examples of the present invention exhibit surface roughness (Ra) of 10 Å or below and has an improved surface property as compared with the comparative examples. Moreover, the example of the present invention exhibit a very small abrasion resistance index of 12 or below, showing that they have an excellent abrasion resistance.

What is claimed is:

1. A glass-ceramic substrate for a magnetic disk comprising alpha-cristobalite (alpha-SiO$_2$) and lithium disilicate (Li$_2$O.2SiO$_2$) as main crystal phases characterized in that the ratio of alpha-cristobalite/lithium disilicate is within a range from 0.25 to 0.35, a grain diameter of crystal grains is within a range of from 0.1 μm to 1.0 μm, surface roughness (Ra) of the substrate after polishing is within a range from 2 Å to 9 Å and the abrasion resistance index (Aa) of the substrate is within a range from 5 to 15.

2. A glass-ceramic substrate as defined in claim 1 formed by subjecting to heat treatment a base glass which consists in weight percent of:

| | |
| --- | --- |
| SiO$_2$ | 75–83% |
| Li$_2$O | 7–13% |
| Al$_2$O$_3$ | 1–5% |
| P$_2$O$_5$ | 1–3% |
| MgO | 0.5–3% |
| ZnO | 0.5–3% |
| K$_2$O | 0–5% |
| As$_2$O$_3$ and/or Sb$_2$O$_3$ | 0–3% |

3. A glass-ceramic substrate as defined in claim 1 formed by subjecting to heat treatment of a base glass which consists in weight percent of:

| | |
| --- | --- |
| SiO$_2$ | 75–83% |
| Li$_2$O | 7–13% |
| Al$_2$O$_3$ | 1–5% |
| P$_2$O$_5$ | 1–3% |
| MgO | 0.5–3% |
| ZnO | 0.5–3% |
| K$_2$O | 0–5% |
| As$_2$O$_3$ and/or Sb$_2$O$_3$ | 0–2% | said heat treatment comprising a first heat treatment within the range of 400° C. to 550° C. and a second heat treatment within a range of 720° C. to 820° C.

* * * * *